United States Patent
Ueda

(10) Patent No.: US 10,792,812 B2
(45) Date of Patent: Oct. 6, 2020

(54) CONTROL DEVICE AND ROBOT SYSTEM

(71) Applicant: Seiko Epson Corporation, Tokyo (JP)

(72) Inventor: Junya Ueda, Azumino (JP)

(73) Assignee: Seiko Epson Corporation (JP)

( * ) Notice: Subject to any disclaimer, the term of this patent is extended or adjusted under 35 U.S.C. 154(b) by 324 days.

(21) Appl. No.: 15/880,685

(22) Filed: Jan. 26, 2018

(65) Prior Publication Data

US 2018/0215038 A1    Aug. 2, 2018

(30) Foreign Application Priority Data

Jan. 27, 2017   (JP) ................................ 2017-013482

(51) Int. Cl.
| | |
|---|---|
| *G05B 15/00* | (2006.01) |
| *G05B 19/00* | (2006.01) |
| *B25J 9/16* | (2006.01) |
| *B25J 13/08* | (2006.01) |
| *B25J 11/00* | (2006.01) |

(52) U.S. Cl.
CPC ........... *B25J 9/1633* (2013.01); *B25J 9/1687* (2013.01); *B25J 11/005* (2013.01); *B25J 13/085* (2013.01); *G05B 2219/45091* (2013.01)

(58) Field of Classification Search
CPC ...... B25J 9/1633; B25J 13/085; B25J 11/005; B25J 9/1687; B25J 9/0018; B25J 9/1605; G05B 2219/45091
See application file for complete search history.

(56) References Cited

U.S. PATENT DOCUMENTS

| | | | | |
|---|---|---|---|---|
| 2007/0078627 | A1* | 4/2007 | Shiga | G06F 30/00 702/182 |
| 2008/0246358 | A1* | 10/2008 | Kubo | B23Q 1/70 310/90.5 |
| 2008/0314206 | A1* | 12/2008 | Akita | B23P 19/066 81/440 |
| 2014/0288712 | A1 | 9/2014 | Ogasawara et al. | |
| 2015/0127138 | A1* | 5/2015 | Ruden | B23P 19/06 700/173 |
| 2016/0101522 | A1* | 4/2016 | Hiruma | B25J 9/1664 700/251 |

FOREIGN PATENT DOCUMENTS

JP        2014-180719 A      9/2014

OTHER PUBLICATIONS https://en.wikipedia.org/wiki/Screw_thread (Year: 2017).*

* cited by examiner

Primary Examiner — Harry Y Oh
Assistant Examiner — Sohana Tanju Khayer
(74) Attorney, Agent, or Firm — Harness, Dickey & Pierce, P.L.C.

(57) ABSTRACT

A control device includes a processor that is configured to execute computer-executable instructions so as to control driving of a robot capable of performing work including a screw-tightening process for tightening a screw, wherein the processor is configured to: receive an input of at least one of characteristics of an object including the screw used in the screw-tightening process; calculate, on the basis of the characteristics received, a value concerning screw-tightening torque at a time of the tightening of the screw by the robot; and cause a display to display the value concerning the screw-tightening torque.

5 Claims, 12 Drawing Sheets

| STRENGTH CLASSIFICATION (JISB1051) | TENSILE STRENGTH (N/mm²) | YIELD POINT |
|---|---|---|
| 3.6 | 300 | 180 |
| 4.6 | 400 | 240 |
| 4.8 | 400 | 320 |
| 5.6 | 500 | 300 |
| 5.8 | 500 | 400 |
| 6.8 | 600 | 480 |
| 8.8 | 800 | 640 |
| 9.8 | 900 | 720 |
| 10.9 | 1000 | 900 |
| 12.9 | 1200 | 1080 |

FIG. 7

| COMPOSITION CLASSIFICATION OF MATERIAL | STEEL TYPE CLASSIFICATION | STRENGTH CLASSIFICATION | TENSILE STRENGTH ( N / mm$^2$ ) | YIELD STRENGTH ( N / mm$^2$ ) |
|---|---|---|---|---|
| AUSTENITIC | A1,A2,A3 A4,A5 | 50 | 500 | 210 |
| | | 70 | 700 | 450 |
| | | 80 | 800 | 600 |
| MARTENSITIC | C1 | 50 | 500 | 250 |
| | | 70 | 700 | 410 |
| | | 110 | 1100 | 820 |
| | C3 | 80 | 800 | 640 |
| | C4 | 50 | 500 | 250 |
| | | 70 | 700 | 410 |
| FERRITIC | F1 | 45 | 450 | 250 |
| | | 60 | 600 | 410 |

FIG. 8

| COARSE THREADED SCREW | | | FINE THREADED SCREW | |
|---|---|---|---|---|
| NOMINAL DIAMETER OF SCREW | PITCH (mm) | EFFECTIVE CROSS SECTION $A_{s,nom}$ (mm$^2$) | NOMINAL DIAMETER OF SCREW | EFFECTIVE CROSS SECTION $A_{s,nom}$ (mm$^2$) |
| M1 | 0.25 | 0.460 | M8×1 | 39.2 |
| M1.2 | 0.25 | 0.732 | M10×1.25 | 61.2 |
| M1.4 | 0.3 | 0.983 | M10×1 | 64.5 |
| M1.6 | 0.35 | 1.27 | M12×1.5 | 88.1 |
| M1.8 | 0.35 | 1.70 | M12×1.25 | 92.1 |
| M2 | 0.4 | 2.07 | M14×1.5 | 125 |
| M2.5 | 0.45 | 3.39 | M16×1.5 | 167 |
| M3 | 0.5 | 5.03 | M18×2 | 204 |

| NOMINAL DIAMETER OF SCREW | PITCH (mm) | |
|---|---|---|
| | COARSE THREAD | FINE THREAD |
| M1 | 0.25 | 0.2 |
| M1.1 | 0.25 | 0.2 |
| M1.2 | 0.25 | 0.2 |
| M1.4 | 0.3 | 0.2 |
| M1.6 | 0.35 | 0.2 |
| M1.8 | 0.35 | 0.2 |
| M2 | 0.4 | 0.25 |
| M2.2 | 0.45 | 0.25 |
| M2.5 | 0.45 | 0.35 |
| M3 | 0.5 | 0.35 |

FIG.11

| NOMINAL DIAMETER OF SCREW | EFFECTIVE DIAMETER (mm) | |
|---|---|---|
| | COARSE THREAD | FINE THREAD |
| M1 | 0.838 | 0.87 |
| M1.1 | 0.938 | 0.97 |
| M1.2 | 1.038 | 1.07 |
| M1.4 | 1.205 | 1.27 |
| M1.6 | 1.373 | 1.47 |
| M1.8 | 1.573 | 1.67 |
| M2 | 1.74 | 1.838 |
| M2.2 | 1.908 | 2.038 |
| M2.5 | 2.208 | 2.273 |
| M3 | 2.675 | 2.773 |

CONTROL DEVICE AND ROBOT SYSTEM

BACKGROUND

1. Technical Field

The present invention relates to a control device and a robot system.

2. Related Art

There has been known a robot system including a base and a robot arm including a plurality of arms (links). One arm of adjacent two arms of the robot arm is turnably coupled to the other arm via a joint section. An arm at a most proximal end side (a most upstream side) is turnably coupled to the base via a joint section. The joint sections are driven by motors. The arms turn according to the driving of the joint sections. An end effector is detachably attached to an arm on a most distal end side (a most downstream side). Work including a screw-tightening process for tightening a screw is performed using such a robot.

JP-A-2014-180719 (Patent Literature 1) discloses a robot apparatus including an arm main body including a screw-tightening mechanism, a torque detecting section that detects a force applied to the arm main body, and a motor control section that performs, in screw-tightening work (a screw-tightening process) by the screw-tightening mechanism, control of the arm main body on the basis of a detection result in the torque detecting section.

However, although Patent Literature 1 describes what kinds of control is performed in the screw-tightening process, Patent Literature 1 does not describe how screw-tightening torque, screw-tightening speed, and the like in the screw-tightening process are set and reflected on a computer program. Therefore, it takes labor and time to set the screw-tightening torque, the screw-tightening speed, and the like in the screw-tightening process and reflect the screw-tightening torque, the screw-tightening speed, and the like on the computer program.

SUMMARY

An advantage of some aspects of the invention is to solve at least a part of the problem described above, and the invention can be implemented as the following forms or application examples.

A control device according to an aspect of the invention is a control device that includes a processor that is configured to execute computer-executable instructions so as to control driving of a robot capable of performing work including a screw-tightening process for tightening a screw, wherein the processor is configured to: receive an input of at least one of characteristics of an object including the screw used in the screw-tightening process; calculate, on the basis of the characteristics received, a value concerning screw-tightening torque at a time of the tightening of the screw by the robot; and cause a display to display the value concerning the screw-tightening torque.

With this configuration, it is possible to easily and quickly perform the setting of the screw-tightening torque in the screw-tightening process.

In the control device according to the aspect of the invention, it is preferable that the characteristics include a strength classification.

With this configuration, it is possible to more accurately perform the setting of the screw-tightening torque in the screw-tightening process.

In the control device according to the aspect of the invention, it is preferable that the processor is configured to cause the robot to fix a first object to a second object by tightening the screw, and the characteristics include a material of the screw, a material of the first object, and a material of the second object.

With this configuration, it is possible to more accurately perform the setting of the screw-tightening torque in the screw-tightening process.

In the control device according to the aspect of the invention, it is preferable that the characteristics include a nominal diameter of the screw.

With this configuration, it is possible to more accurately perform the setting of the screw-tightening torque in the screw-tightening process.

In the control device according to the aspect of the invention, it is preferable that the characteristics include information concerning which type of a coarse thread or a fine thread the screw is.

With this configuration, it is possible to more accurately perform the setting of the screw-tightening torque in the screw-tightening process.

A robot system according to another aspect of the invention includes: a robot capable of performing work including a screw-tightening process for tightening a screw; and a control device including a processor that is configured to execute computer-executable instructions so as to control driving of the robot; wherein the processor is configured to: receive an input of at least one of characteristics of an object including the screw used in the screw-tightening process; calculate, on the basis of the characteristics received, a value concerning screw-tightening torque at a time of the tightening of the screw by the robot; and cause a display to display the value concerning the screw-tightening torque.

With this configuration, it is possible to easily, quickly, and accurately perform setting of screw-tightening torque in a screw-tightening process.

In the robot system according to the aspect of the invention, it is preferable that the robot system includes a screwdriver connected to the robot, wherein the processor is configured to: cause the robot to rote the screw and tighten the screw by the screwdriver in the screw-tightening process; receive an input of a number of rotations of the screwdriver; calculate, on the basis of the characteristics and the number of rotations of the screwdriver received, a value concerning screw-tightening speed at the time of the tightening of the screw by the robot; and cause the display to display the value concerning the screw-tightening speed.

With this configuration, it is possible to easily, quickly, and accurately perform setting of the screw-tightening speed in the screw-tightening process.

In the robot system according to the aspect of the invention, it is preferable that the processor is configured to: receive an input of the screw-tightening speed; and control, in the screw-tightening process, the driving of the robot on the basis of the screw-tightening speed received.

With this configuration, it is possible to accurately tighten the screw.

In the robot system according to the aspect of the invention, it is preferable that the screwdriver is an electric screwdriver, and the processor is configured to: receive an input of the screw-tightening torque; and control, in the screw-tightening process, driving of the electric screwdriver on the basis of the screw-tightening torque received.

With this configuration, it is possible to accurately tighten the screw.

In the robot system according to the aspect of the invention, it is preferable that the processor is configured to perform, in the screw-tightening process, force control on the basis of an output of the force sensor.

With this configuration, for example, by appropriately setting a target force and performing impedance control (tracer control) as force control, it is possible to suppress come-out, accurately tighten the screw, and suppress damage to the screw and the object in the screw tightening.

By performing the impedance control, even if the screw and a screw hole deviate from each other, it is easy to insert the screw into the screw hole.

In the robot system according to the aspect of the invention, it is preferable that the processor is configured to set, in the force control, a target force in a direction orthogonal to an advancing direction of the screw to 0.

With this configuration, by setting the target force in the direction orthogonal to the advancing direction of the screw to 0 and performing the impedance control (the tracer control) as the force control, it is possible to suppress come-out and accurately tighten the screw.

By performing the impedance control, even if the screw and the screw hole deviate from each other, it is easy to insert the screw into the screw hole.

In the control device according to the aspect of the invention, it is preferable that the processor is configured to perform position control in at least a part of a period in which the force control is performed.

With this configuration, it is possible to perform the screw tightening in a short time while causing the screw to trace the screw hole compared with when the screw tightening is performed only by the force control.

BRIEF DESCRIPTION OF THE DRAWINGS

The invention will be described with reference to the accompanying drawings, wherein like numbers reference like elements.

FIG. 4 is a diagram for explaining work and the like.

FIG. 7 is a diagram showing a table used in calculating recommended screw-tightening torque and recommended screw-tightening speed in a control device of the robot system shown in FIG. 1.

FIG. 8 is a diagram showing a table used in calculating recommended screw-tightening torque and recommended screw-tightening speed in the control device of the robot system shown in FIG. 1.

FIG. 9 is a diagram showing a table used in calculating recommended screw-tightening torque and recommended screw-tightening speed in the control device of the robot system shown in FIG. 1.

FIG. 10 is a diagram showing a table used in calculating recommended screw-tightening torque and recommended screw-tightening speed in the control device of the robot system shown in FIG. 1.

FIG. 11 is a diagram showing a table used in calculating recommended screw-tightening torque and recommended screw-tightening speed in the control device of the robot system shown in FIG. 1.

DESCRIPTION OF EXEMPLARY EMBODIMENTS

Embodiments of the invention are explained in detail below with reference to the accompanying drawings.

First Embodiment

Figure 1:
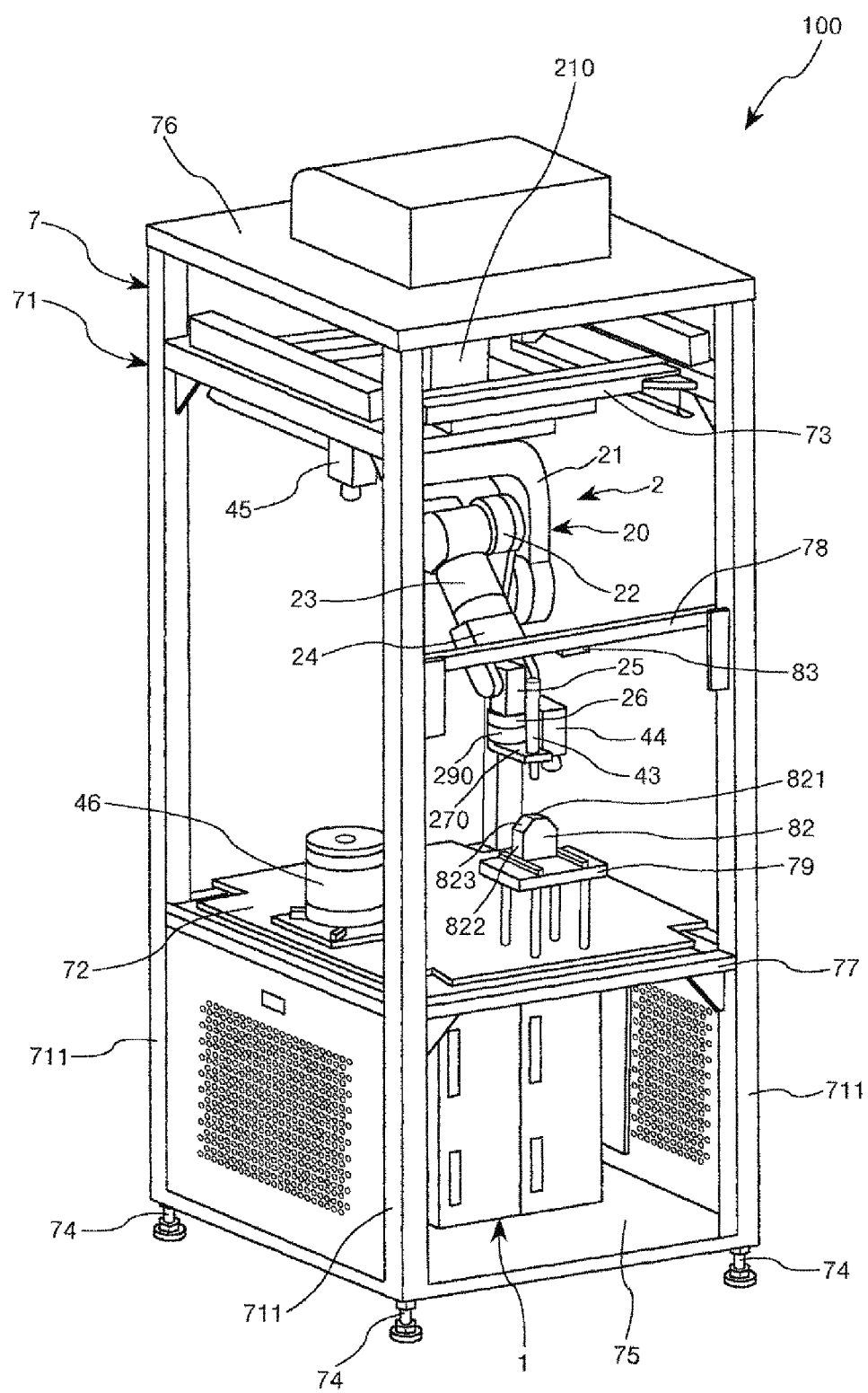
FIG. 1 is a perspective view showing a robot of a robot system according to a first embodiment of the invention.
Figure 2:
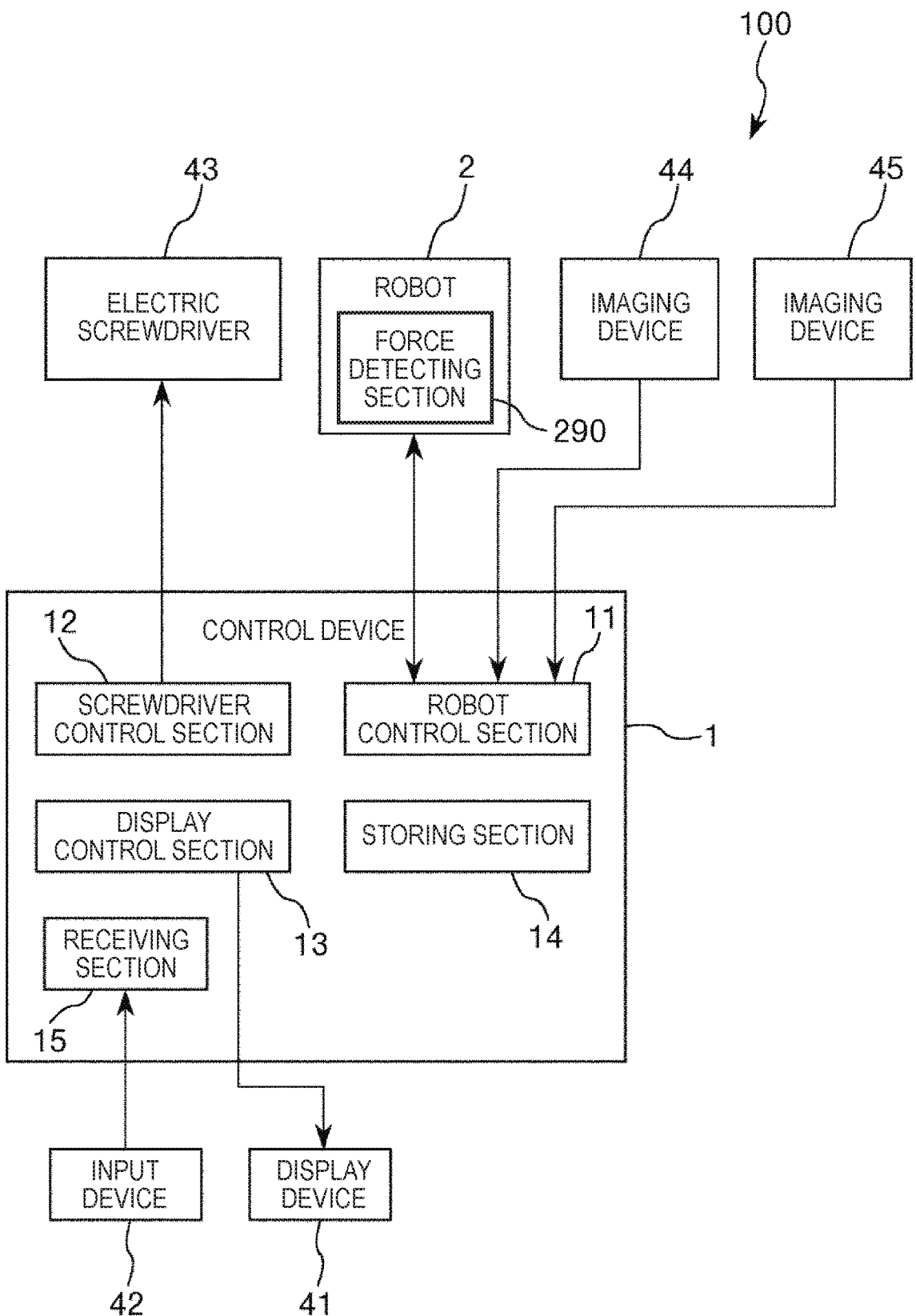
FIG. 2 is a block diagram of the robot system shown in FIG. 1.
Figure 3:
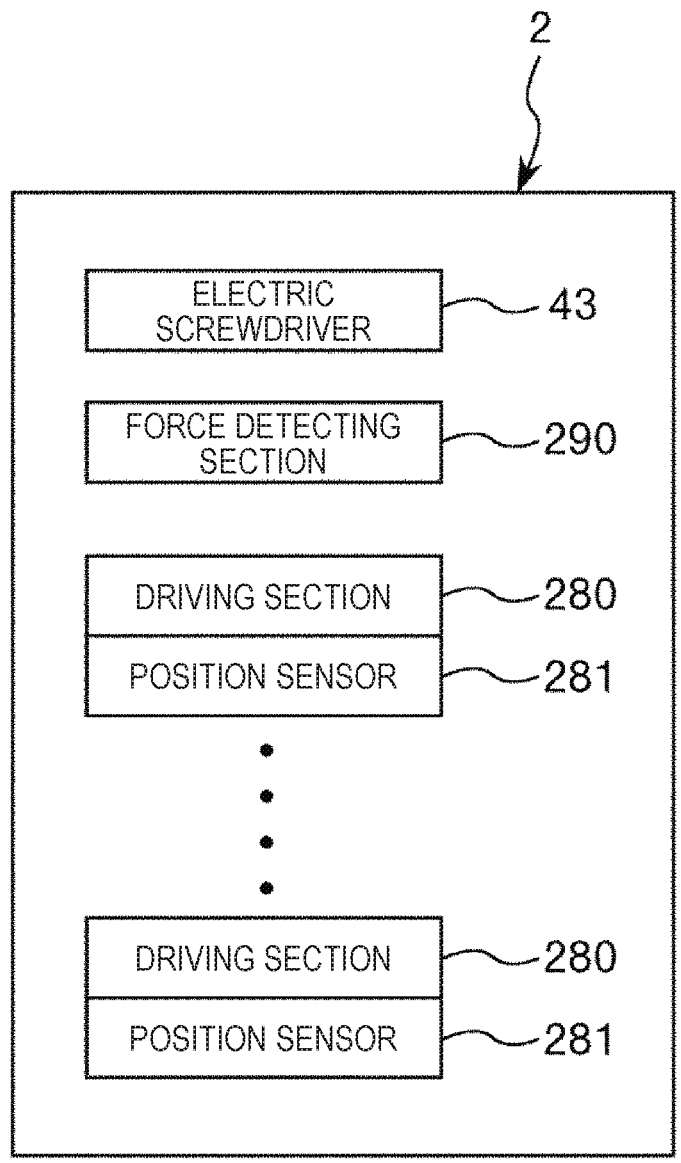
FIG. 3 is a block diagram of the robot of the robot system shown in FIG. 1.
Figure 4:
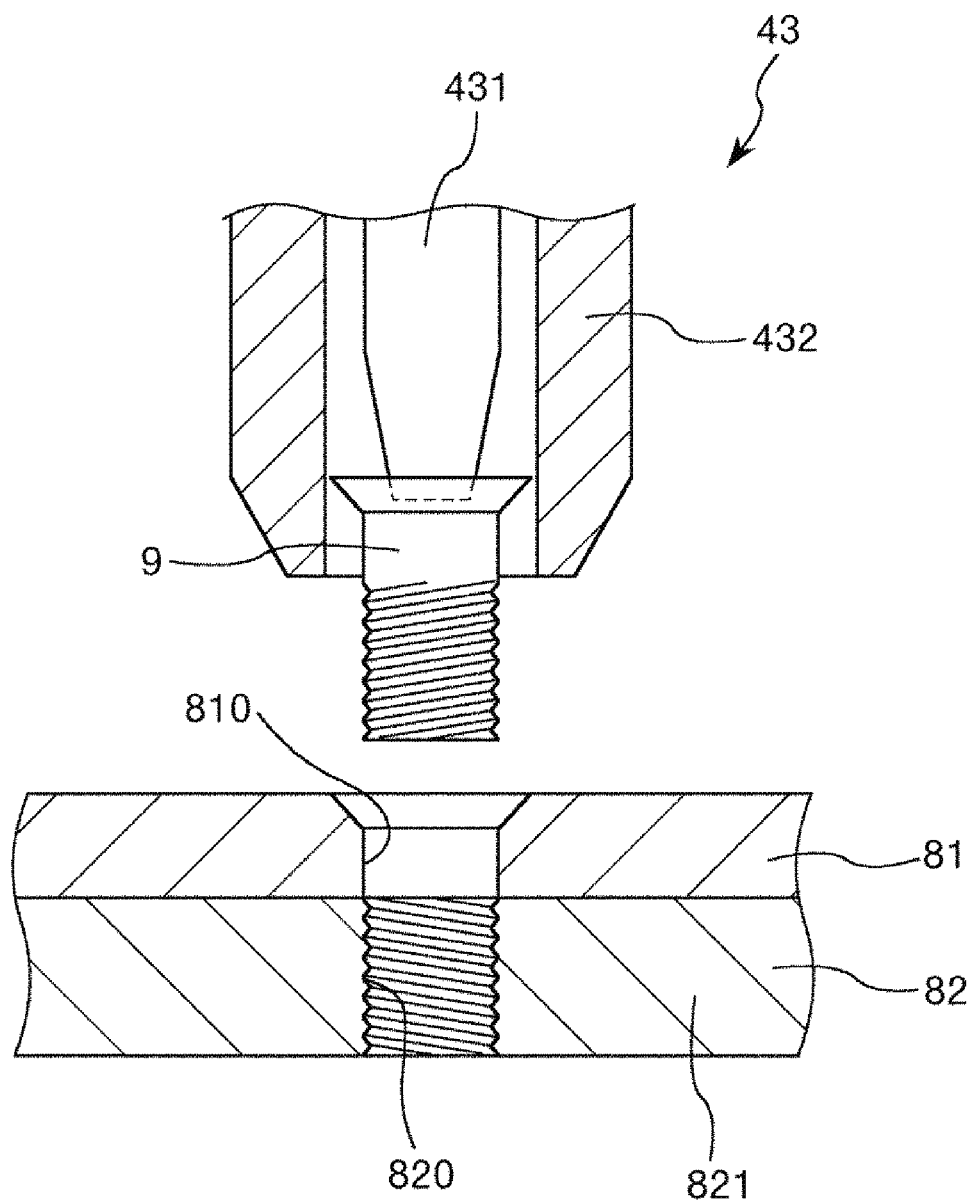
Figure 5:
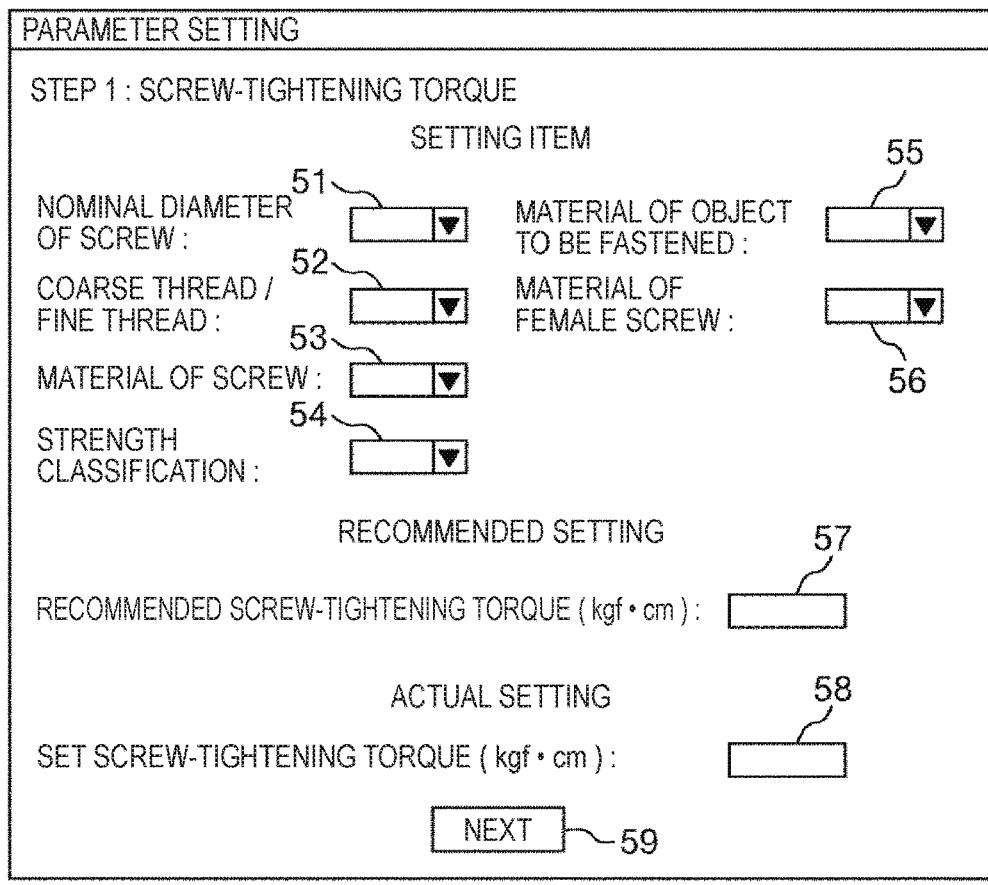
FIG. 5 is a diagram showing a window displayed on a display device of the robot system shown in FIG. 1.
Figure 6:
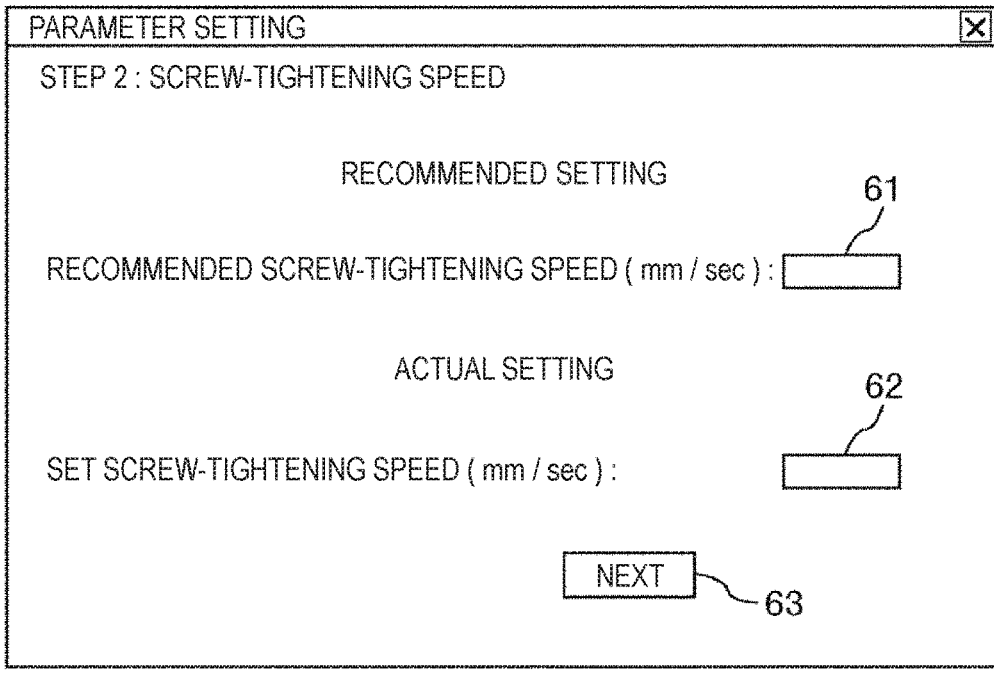
FIG. 6 is a diagram showing a window displayed on the display device of the robot system shown in FIG. 1.
Figure 12:
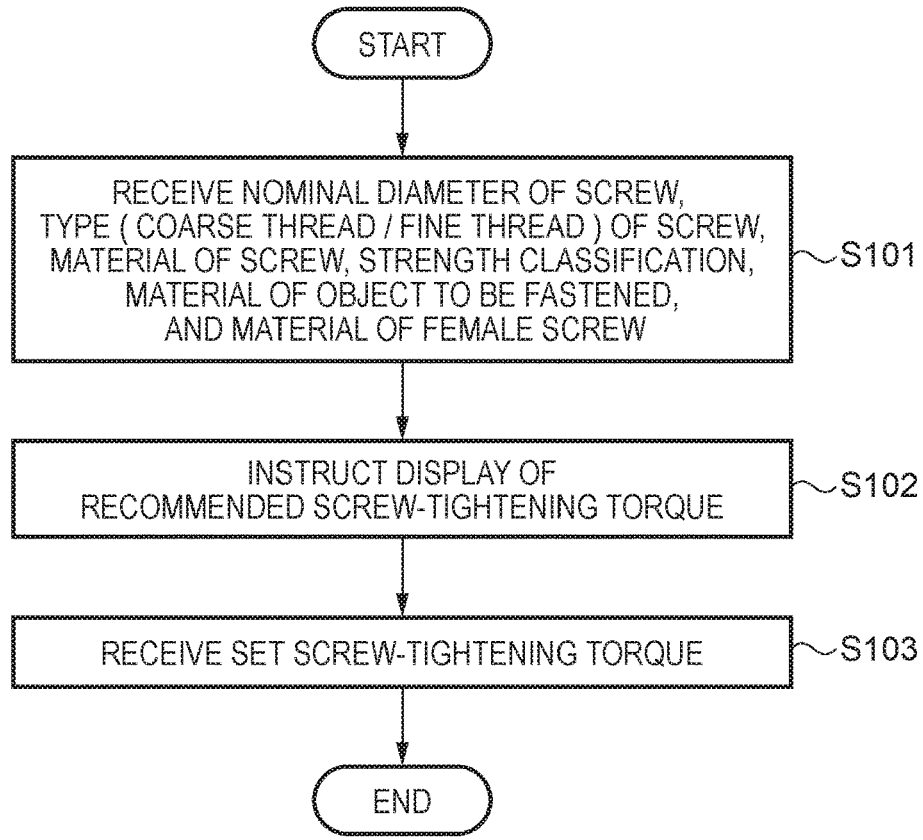
FIG. 12 is a flowchart for explaining a control operation of the control device of the robot system shown in FIG. 1.
Figure 13:
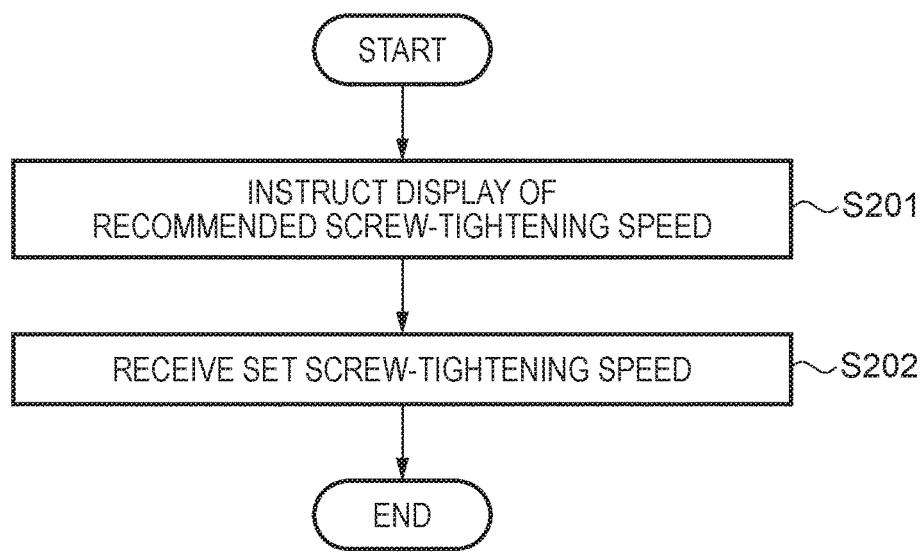
FIG. 13 is a flowchart for explaining a control operation of the control device of the robot system shown in FIG. 1.

FIG. 1 is a perspective view showing a robot of a robot system according to a first embodiment of the invention. FIG. 2 is a block diagram of the robot system shown in FIG. 1. FIG. 3 is a block diagram of the robot of the robot system shown in FIG. 1. FIG. 4 is a diagram for explaining work and the like. FIG. 5 is a diagram showing a window displayed on a display device of the robot system shown in FIG. 1. FIG. 6 is a diagram showing a window displayed on the display device of the robot system shown in FIG. 1. FIGS. 7 to 11 are diagrams showing tables used in calculating recommended screw-tightening torque and recommended screw-tightening speed in a control device of the robot system shown in FIG. 1. The tables shown in FIGS. 7 to 11 are specified in JIS. FIG. 12 is a flowchart for explaining a control operation of the control device of the robot system shown in FIG. 1. FIG. 13 is a flowchart for explaining a control operation of the control device of the robot system shown in FIG. 1.

Note that, in the following explanation, for convenience of explanation, an upper side in FIG. 1 is referred to as "upper" and a lower side in FIG. 1 is referred to as "lower". A base 210 side in FIG. 1 is referred to as "proximal end" and the opposite side of the base 210 side (a side of an electric screwdriver 43 functioning as an end effector) is referred to as "distal end". An up-down direction in FIG. 1 is set as the "vertical direction" and a left-right direction in FIG. 1 is set as the "horizontal direction". In this specification, "horizontal" includes not only "completely horizontal" but also inclination within ±5° with respect to the "horizontal". Similarly, in this specification, "vertical" includes not only "completely vertical" but also inclination within ±5° with respect to the "vertical". In this specification, "parallel" includes not only complete parallelism of two lines (including axes) or surfaces but also inclination within ±5° of the lines or the surfaces. In this specification, "orthogonal" includes not only complete orthogonality of two lines (including axes) or surfaces but also inclination within ±5° of the lines or the surfaces.

In FIG. 4, for convenience of explanation, an x axis, a y axis, and a z axis are shown as three axes orthogonal to one another. In the following explanation, a direction parallel to the x axis is referred to as "x-axis direction" as well, a direction parallel to the y axis is referred to as "y-axis direction" as well, and a direction parallel to the z axis is referred to as "z-axis direction" as well. In the following explanation, distal end sides of arrows shown in the figures are referred to as "+" and proximal end sides of the arrows are referred to as "−". A + direction parallel to the x axis is referred to as "+x-axis direction" as well, a − direction parallel to the x axis is referred to as "−x-axis direction" as well, a + direction parallel to the y axis is referred to as "+y-axis direction" as well, a − direction parallel to the y axis is referred to as "−y-axis direction" as well, a + direction parallel to the z axis is referred to as "+z-axis direction" as well, and a − direction parallel to the z axis is referred to as "−z-axis direction" as well.

A robot system 100 shown in FIGS. 1 and 2 is an apparatus used in work such as holding, conveyance, assembly, and inspection of work such as electronic components and electronic devices. The robot system 100 includes cell 7, a control device 1, a robot 2, a display device 41 (a display section), an input device 42 (an input section), the electric screwdriver 43, which is an example of a screwdriver (an end effector), and imaging devices 44 and 45 (imaging sections) having an imaging function.

In this way, the robot system 100 includes at least the control device 1 and the robot 2 controlled by the control device 1.

The robot 2 and the control device 1 are provided in the cell 7. Note that the control device 1 may be provided on the outside of the cell 7.

In this embodiment, the control device 1 is configured separately from the robot 2. In this case, for example, the robot 2 and the control device 1 may be connected by a cable (a wire) to perform communication in a wired system. The cable may be omitted to perform communication in a wireless system. That is, the robot 2 and the control device 1 may be connected by wired communication or may be connected by wireless communication.

Note that the control device 1 is not limited to the configuration separate from the robot 2. Apart or the entire control device 1 may be incorporated in the robot 2. In this case, for example, the control device 1 can be incorporated in the base 210 of the robot 2.

Cell

The cell 7 is a member that surrounds (houses) the robot 2. The cell 7 can be easily relocated. In the cell 7, the robot 2 mainly performs work such as assembly.

The cell 7 includes four foot sections 74 for setting the entire cell 7 in a setting space such as a floor, a frame body section 71 supported by the four foot sections 74, a workbench 72 provided in a lower part of the frame body section 71, a ceiling section 73 provided in an upper part of the frame body section 71, a bottom plate 75 (a lower plate) provided at the lower end of the frame body section 71, and a top plate 76 (an upper plate) provided at the upper end of the frame body section 71. An external shape of the cell 7 viewed from the vertical direction is not particularly limited. In this embodiment, the external shape is a square (a quadrangle). Note that the external shape may be, for example, a rectangle.

The frame body section 71 includes four columns 711 extending in the vertical direction (the up-down direction in FIG. 1). The bottom plate 75 is provided at the lower ends of the four columns 711. The top plate 76 is provided at the upper ends of the four columns 711.

In this embodiment, the workbench 72 is formed in a tabular shape. The workbench 72 is fixed to a frame 77 provided in a lower part of the frame body section 71. The robot 2 can perform various kinds of work on the workbench 72.

A table 79 is placed on the workbench 72. Work 82, which is an example of the second object, is placed on the table 79. The work 82 is formed in a hexagonal shape (a polygonal shape) when viewed from the front or the back. A plurality of female screws (not shown in the figure), into which a screw 9 (see FIG. 4) can be screwed, are respectively formed in an upper part 821 (an upper surface), a side part 822 (a side surface), and an inclined part 823 (an inclined surface) disposed between the upper part 821 and the side part 822.

A crossbar 78 laid over between two columns 711 is provided between the ceiling section 73 and the workbench 72 in the up-down direction. Work 83, which is an example of another second object, is attached to the crossbar 78. The work 83 is formed in a tabular shape. A plurality of female screws (not shown in the figure), into which the screw 9 (see FIG. 4) can be screwed, are formed in the work 83.

A screw vibration feeder 46, which is an example of a supply section of the screw 9, is placed on the workbench 72. The screw 9 can be arrayed with the posture of the screw 9 aligned such that the head of the screw 9 faces upward.

The ceiling section 73 and the ceiling plate 76 are respectively members capable of supporting the robot 2. In this embodiment, the ceiling section 73 is formed in a frame shape. The base 210 of the robot 2 is fixed to (supported by) the ceiling section 73 or the top plate 76 directly or via a predetermined member. Note that each of the ceiling section 73 and the top plate 76 is defined as a ceiling section in a broad sense. The control device 1 is placed on the bottom plate 75.

Safety plates (not shown in the figure) or the like may be set among the adjacent columns 711 further on the upper side than the workbench 72, that is, on four side surfaces of the frame body section 71 to prevent an operator and foreign matters such as dust from intruding into the frame body section 71.

The cell 7 does not have to include the foot sections 74. In that case, the bottom plate 75 may be directly set in the setting space.

Robot

A type of the robot is not particularly limited. However, in this embodiment, the robot 2, which is an example of a vertical articulated robot, is used. The "vertically articulated robot" refers to a robot in which the number of axes (the number of arms) is three and two axes among the three axes cross (are orthogonal to) each other.

As shown in FIG. 1, the robot 2 is a so-called six-axis vertical articulated robot (a degree of freedom is six). The robot 2 includes the base 210 attached to the ceiling section 73 or the top plate 76, a robot arm 20 connected to the base 210, a force detecting section 290 detachably attached to the distal end of the robot arm 20, an attachment section 270 detachably attached to the distal end of the force detecting section 290, and an electric screwdriver 43 (an end effector) detachably attached to the attachment section 270. Note that a movable section of the robot 2 is configured by the robot arm 20, the force detecting section 290, the attachment section 270, the electric screwdriver 43, and the like.

The robot arm 20 included in the robot 2 includes a first arm 21 (an arm), a second arm 22 (an arm), a third arm 23 (an arm), a fourth arm 24 (an arm), a fifth arm 25 (an arm), and a sixth arm 26 (an arm). The arms 21 to 26 are coupled in this order from the proximal end side toward the distal end side. The force detecting section 290 is configured by, for example, a force sensor (e.g., a six-axis force sensor) that detects a force (including a moment) applied to the electric screwdriver 43.

The electric screwdriver 43 includes a bit 431, a cover 432 formed in a cylindrical shape, and a motor (not shown in the figure) that generates a driving force for rotating the bit 431. The distal end portion of the bit 431 is disposed on the inside of the cover 432. When the motor is driven to rotate the bit 431 in a state in which the distal end of the bit 431 is inserted into the head of the screw 9, the screw 9 rotates. The electric screwdriver 43 is configured to be capable of decompressing the inside of the cover 432. By decompressing the inside of the cover 432, it is possible to attract the screw 9, which is the male screw, to the cover 432 and hold (grip) the screw 9.

Note that the electric screwdriver 43 is not particularly limited and can be selected as appropriate according to a type and the like of the screw 9 to be fastened. Examples of the electric screwdriver 43 include a cross-recessed screwdriver and a flat-bladed screwdriver.

As shown in FIG. 3, the robot 2 includes driving sections 280 that turn (drive) one arm with respect to the other arm (or the base 210). The driving sections 280 include motors (not shown in the figure) that generate driving forces and reduction gears (not shown in the figure) that reduce the driving forces of the motors. As the motors included in the driving sections 280, a servomotor such as an AC servomotor or a DC servomotor can be used. As the reduction gears, for example, a planetary gear-type reduction gear or a wave-motion gear device can be used. In the driving sections 280, position sensors 281 (angle sensors) that detect rotation angles of rotating shafts of the motors or the reduction gears are provided. In this embodiment, the robot 2 includes six driving sections 280 and six position sensors 281 as many as six arms 21 to 26. The driving sections 280 are respectively electrically connected (hereinafter simply referred to as "connected" as well) to corresponding motor drivers (not shown in the figure) included in the control device 1. The driving sections 280 are controlled by a robot control section 11 of the control device 1 via the motor drivers.

Control Device

The control device 1 is a control device that controls driving of the robot 2 capable of performing work including a screw-tightening process for tightening the screw 9. The control device 1 includes a receiving section 15 that receives an input of at least one of characteristics of an object including the screw 9 used in the screw-tightening process (besides the screw 9, for example, work 81 and a female screw 820), a display control section 13 that calculate, on the basis of the characteristics received by the receiving section 15, recommended screw-tightening torque, which is an example of a value concerning screw-tightening torque at a time of the tightening of the screw 9 by the robot 2 and causes the display device 41 (the display section) to display the recommended screw-tightening torque (the value concerning the screw-tightening torque), and the robot control section 11 and a screwdriver control section 12, which are examples of a control section that controls at least the driving of the robot 2.

Consequently, it is possible to easily, quickly, and accurately perform setting of the screw-tightening torque in the screw-tightening process. This is specifically explained below.

The control device 1 includes the robot control section 11, the screwdriver control section 12, the display control section 13 (a guidance), a storing section 14, and the receiving section 15. The control device 1 controls driving of the robot 2 (including the electric screwdriver 43), the imaging devices 44 and 45, and the display device 41. A control section is configured by the robot control section 11 and the screwdriver control section 12.

The control device 1 is configured to be communicable with the robot control section 11, the screwdriver control section 12, the display control section 13, the storing section 14, and the receiving section 15. That is, the robot control section 11, the screwdriver control section 12, the display control section 13, the storing section 14, and the receiving section 15 are connected to one another by wired or wireless communication (hereinafter simply referred to as "connected").

The robot 2, the display device 41, the input device 42, the electric screwdriver 43, and the imaging devices 44 and 45 are connected to the control device 1 by wired or wireless communication.

That is, the robot 2 and the imaging devices 44 and 45 are connected to the robot control section 11 of the control device 1 by wired or wireless communication. The electric screwdriver 43 is connected to the screwdriver control section 12 of the control device 1 by wired or wireless communication. The display device 41 is connected to the display control section 13 of the control device 1 by wired or wireless communication. The input device 42 is connected to the receiving section 15 of the control device 1 by wired or wireless communication.

Robot Control Section

The robot control section 11 controls driving of the robot 2, specifically, driving of portions other than the electric screwdriver 43 in the robot 2, that is, the robot arm 20 and the like. The robot control section 11 is a computer in which computer programs (an OS, etc.) are installed. The robot control section 11 includes, for example, a CPU functioning as a processor, a RAM, and a ROM functioning as a memory in which computer programs are stored. Functions of the robot control section 11 can be realized by, for example, executing various computer programs with the CPU.

Driver Control Section

The screwdriver control section 12 controls driving of the electric screwdriver 43. The screwdriver control section 12 is a computer in which computer programs (an OS, etc.) are installed. The screwdriver control section 12 includes, for example, a CPU functioning as a processor, a RAM, and a ROM in which computer programs are stored. Functions of the screwdriver control section 12 can be realized by, for example, executing various computer programs with the CPU.

Display Control Section

The display control section 13 has a function of causing the display device 41 to display various images (including various screens such as windows), characters, and the like. That is, the display control section 13 controls driving of the display device 41. Functions of the display control section 13 can be realized by a GPU and the like.

Storing Section

The storing section 14 has a function of storing various kinds of information (including data and computer programs). The storing section 14 stores tables shown in FIGS. 7 to 11, control programs, and the like. Functions of the storing section 14 can be realized by a ROM and the like and a so-called external storage (not shown in the figure).

Receiving Section

The receiving section 15 has a function of receiving an input from the input device 42. Functions of the receiving section 15 can be realized by, for example, an interface circuit. Note that, for example, when a touch panel is used, the receiving section 15 has a function of an input detecting section that detects, for example, contact of a finger of a user on the touch panel.

Display Device

The display device 41 includes a monitor (not shown in the figure) configured by, for example, a liquid crystal display or an EL display. The display device 41 has a function of displaying, for example, various images (including various screens such as windows) and characters.

Input Device

The input device 42 is configured by, for example, a mouse and a keyboard. Therefore, the user can give instructions of various kinds of processing to the control device 1 by operating the input device 42.

Specifically, the user can give instructions to the control device 1 with operation for clicking, with the mouse of the input device 42, various screens (windows, etc.) displayed on the display device 41 or operation for inputting characters, numbers, and the like with the keyboard of the input device 42. In the following explanation, the instruction given by the user using the input device 42 (the input by the input device 42) is hereinafter referred to as "operation instruction" as well. The operation instruction includes selection operation for selecting, with the input device 42, desired content from contents displayed on the display device 41 and an input instruction for inputting characters, numbers, and the like with the input device 42. The input includes selection.

Note that, in this embodiment, a display input device (not shown in the figure) functioning as both of the display device 41 and the input device 42 (a display section and an input section) may be provided instead of the display device 41 and the input device 42. As the display input device, for example, a touch panel (an electrostatic touch panel or a pressure sensitive touch panel) can be used. The input device 42 may be configured to recognize sound (including voice).

Imaging Devices

In this embodiment, the robot system 100 includes the imaging devices 44 and 45 as a plurality of imaging devices. The imaging devices 44 and 45 respectively include, for example, imaging elements configured by CCD (Charge Coupled Device) image sensors including pluralities of pixels and lenses (optical systems).

The imaging device 44 (a mobile camera) is fixed to the robot arm 20 included in the robot 2. In this embodiment, the imaging device 44 is attached to the distal end of the robot arm 20, that is, the attachment section 270. The imaging device 44 is attached in a posture capable of imaging the distal end side of the robot arm 20.

The imaging device 45 (a fixed camera) is disposed around the robot 2 and fixed. In this embodiment, the imaging device 45 is disposed above the screw vibration feeder 46 in the cell 7 and attached to the ceiling section 73. The imaging device 45 is attached in a posture capable of imaging the downward vertical direction. The imaging device 45 is capable of imaging the periphery of the screw vibration feeder 46.

Basics of Control in the Robot System

In work, the control device 1 controls driving (operation) of the robot 2 with position control, force control, and the like on the basis of outputs of the position sensors 281, the force detecting section 290, and the imaging devices 44 and 45, that is, detection results of the position sensors 281, a detection result of the force detecting section 290, image data obtained by imaging of the imaging devices 44 and 45, and the like.

The position control is control of the operation of the robot 2 for moving the electric screwdriver 43 to be in a target posture in a target position on the basis of information concerning the position and the posture of the electric screwdriver 43 of the robot 2. The position control may be performed move, for example, the distal end portion of the robot arm 20 instead of the electric screwdriver 43. Information concerning the position and the posture of the electric screwdriver 43 can be calculated on the basis of the detection results of the position sensors 281 and the image data obtained by the imaging of the imaging devices 44 and 45.

The force control is control of the operation of the robot 2 for changing the position and the posture of the electric screwdriver 43 and pushing and pulling the electric screwdriver 43 on the basis of a detection result of the force detecting section 290. The force control includes, for example, impedance control and force trigger control.

In the force trigger control, the control device 1 performs detection with the force detecting section 290 and moves (including a change of a posture), that is, operates the robot arm 20 until a predetermined force is detected by the force detecting section 290.

The impedance control includes tracer control. First, to briefly explain, the control device 1 controls the operation of the robot arm 20 (the robot 2) to maintain a force applied to the distal end portion of the robot arm 20 at a predetermined force as much as possible, that is, maintain a force in a predetermined direction detected by the force detecting section 290 at a target value (including 0) as much as possible. Consequently, for example, when the impedance control is performed on the robot arm 20, the robot arm 20 performs an operation in which the electric screwdriver 43 traces an object in the predetermined direction.

More specifically, a model of the impedance control of the robot 2 can be represented by an equation of motion indicated by the following Expression (A).

$$f(t) = mx'' + cx' + kx \quad (A)$$

In Expression (A) described above, m represents mass (inertia), c represents a coefficient of viscosity, k represents a coefficient of elasticity (rigidity), f(t) represents a force, and x represents displacement (a position) from a target position. Primary differential of x, that is, x' corresponds to speed. Secondary differential of x, that is, x'' corresponds to acceleration. Note that, in the following explanation, m, c, and k are respectively simply referred to as "parameters" as well.

In the impedance control, a control system for imparting characteristics of Expressions (A) described above to the distal end portion of the robot arm 20 is configured. That is, the control device 1 performs control as if the distal end portion of the robot arm 20 has imaginary mass, an imaginary coefficient of viscosity, and an imaginary coefficient of elasticity represented by Expression (A) described above.

The parameters m, c, and k in Expression (A) described above are respectively not particularly limited and are set as appropriate on the basis of conditions. That is, the parameters m, c, and k are respectively set to convenient values according to work performed by the robot 2.

The robot system 100 performs work on a predetermined object or the like, for example, under the control by the control device 1. In this embodiment, the robot system 100 performs work including a screw-tightening process for tightening the screw 9 (performing screw tightening) (hereinafter simply referred to as "screw-tightening work" as well).

The screw-tightening work is explained below.

In the screw-tightening work, the robot 2 tightens the screw 9 with the electric screwdriver 43 to thereby fix the work 81, which is an example of the first object, to the work 82, which is an example of the second object (see FIG. 4). The robot 2 tightens the screw 9 with the electric screwdriver 43 to thereby fix the work 81, which is an example of the first object, to the work 83, which is an example of the second object (see FIG. 1).

As shown in FIG. 4, the screw 9 is the male screw. A plurality of holes 810, into which the screw 9 can be inserted, are formed in the work 81.

A plurality of female screws 820, into which the screw 9 can be screwed, are formed in the upper part 821 of the work 82. In the side part 822 and the inclined part 823 (see FIG. 1), similarly, pluralities of female screws (not shown in the figure), into which the screw 9 can be screwed, are formed.

A plurality of female screws (not shown in the figure), into which the screw 9 can be screwed, are formed in the work 83 (see FIG. 1).

In the screw-tightening work, it is possible to perform screw tightening in four patterns described below.

In a first pattern, as shown in FIG. 4, the work 81 is disposed in the upper part 821 of the work 82, the screw 9 is inserted into the hole 810 of the work 81 from above, and the screw 9 is tightened to fix the work 81 to the upper part 821.

In a second pattern, the work 81 is disposed in the side part 822 (see FIG. 1) of the work 82, the screw 9 is inserted into the hole 810 of the work 81 from a side, and the screw 9 is tightened to fix the work 81 to the side part 822.

In a third pattern, the work 81 is disposed in the inclined part 823 (see FIG. 1) of the work 82, the screw 9 is inserted into the hole 810 of the work 81 from obliquely above, and the screw 9 is tightened to fix the work 81 to the inclined part 823.

In a fourth pattern, the work 81 is disposed on the work 83 (see FIG. 1), the screw 9 is inserted into the hole 810 of the work 81 from below, and the screw 9 is tightened to fix the work 81 to the work 83.

The operation and the control of the robot 2 in the screw-tightening work are explained with reference to FIGS. 1, 4, and the like. Note that the first pattern among the four patterns is representatively explained.

In the screw-tightening work, first, the robot 2 operates the robot arm 20 of the robot 2 to take the screw 9 from the screw vibration feeder 46 (see FIG. 1). In this case, the robot 2 images, with the imaging device 45 (see FIG. 1), the screw vibration feeder 46 and the vicinity of the screw vibration feeder 46 and moves the cover 432 of the electric screwdriver 43 to the position of the head of the screw 9 on the basis of obtained image data while rotating the bit 431 of the electric screwdriver 43. The robot 2 decompresses the inside of the cover 432, attracts the screw 9 to the cover 432, and holds the screw 9. The robot 2 decompresses the inside of the cover 432 while rotating the bit 431 of the electric screwdriver 43 to thereby insert the distal end portion of the bit 431 into the groove of the head of the screw 9.

Subsequently, as shown in FIG. 4, the robot 2 operates the robot arm 20 and moves the screw 9 to the vicinity of the hole 810 above the hole 810 of the work 81. The operation of the robot arm 20 is controlled by position control. In this case, the robot 2 may teach the operation of the robot arm 20 to the robot arm 20 or may perform imaging with the imaging device 44 (see FIG. 1) and operate the robot arm 20 on the basis of obtained image data.

Subsequently, the robot 2 resets the force detecting section 290. In this case, the electric screwdriver 43 is stopped. Consequently, it is possible to accurately perform detection of a force by the force detecting section 290.

Subsequently, the robot 2 operates the robot arm 20 and the electric screwdriver 43, inserts the screw 9 into the hole 810 of the work 81 from above, and tightens the screw 9 to fix the work 81 to the upper part 821 of the work 82 (the screw-tightening process). Note that the screw 9 rotates according to the rotation of the bit 431 of the electric screwdriver 43 and is screwed into the female screw 820 of the work 82. That is, the screw 9 is tightened.

In the operation of the robot arm 20 in the screw-tightening process, operation concerning the z-axis direction, that is, an advancing direction of the screw 9 is controlled by the position control. The position control is performed on the basis of set screw-tightening speed and the like explained below. For example, when the screw 9 moves to a target position, that is, when a movement amount of the screw 9 reaches a target moving distance, the movement in the z-axis direction of the robot arm 20 is stopped. In this case, for example, the movement in the z-axis direction of the robot arm 20 may be stopped when a screw-tightening completion signal (torque-up) is input before the screw 9 reaches the target moving distance. Note that the target position and the target moving distance are set on the basis of, for example, the length of the screw 9 (e.g., the distance from a screw-tightening start position to the screw hole, the length of the screw 9, and a margin).

In the operation of the robot arm 20 in the screw-tightening process, operations in the x-axis direction, the y-axis direction, and the z-axis direction, that is, operations in the advancing direction of the screw 9 and directions orthogonal to the advancing direction of the screw 9 are controlled by the impedance control (the force control). In the impedance control, target forces in the x-axis direction, the y-axis direction, and the z-axis direction are respectively set to "0".

By performing such impedance control, it is possible to cause the bit 431 of the electric screwdriver 43 to trace the groove of the head of the screw 9. It is possible to suppress come-out. It is possible to prevent the electric screwdriver 43 from damaging the screw 9 and the work 81 and the work 82. The come-out refers to a phenomenon in which, when the screw 9 is tightened by the electric screwdriver 43, the distal end portion of the bit 431 rises, deviates, or comes off from the groove of the head of the screw 9.

Specifically, first, by setting the target force in the z-axis direction to "0", it is possible to prevent the electric screwdriver 43 from damaging the screw 9 and the work 81 and the work 82. When the target forces in the x-axis direction and the y-axis direction are set to "0", if the come-out is about to occur, the electric screwdriver 43 moves in a direction in which the force detected by the force detecting section 290 approaches "0", that is, the opposite direction of a direction of the come-out. In this way, it is possible to suppress the come-out.

By performing the position control and performing the screw-tightening while performing the impedance control, compared with when the screw-tightening is performed only by the impedance control, it is possible to perform the screw tightening in a short time while causing the screw 9 to trace the hole 810 and the female screw 820.

In the screw-tightening process, the bit 431 of the electric screwdriver 43 rotates at the number of rotations calculated from set screw-tightening torque explained below. After the torque of the electric screwdriver 43 reaches the set screw-tightening torque, when a predetermined time elapses, the driving of the electric screwdriver 43 is stopped.

Consequently, the screw tightening is completed and the work 81 is fixed to the work 82 by the screw 9.

Note that, in the screw-tightening process, imaging may be performed by the imaging device 44 (see FIG. 1). The robot arm 20 may be operated on the basis of obtained image data.

In such a robot system 100, screw-tightening torque and screw-tightening speed in the screw-tightening process are set as explained below.

First, a window (a screen for screw-tightening torque setting) used in setting screw-tightening torque and screw-tightening speed is explained.

As shown in FIG. 5, when screw-tightening torque is set, a window for screw-tightening torque setting (a screen for screw-tightening torque setting) 5 is displayed on the display device 41.

In the window 5, list boxes 51, 52, 53, 54, 55, and 56, a text box for display 57, a text box for input 58, and a button 59 (an icon) on which "next" is displayed are displayed.

The list box 51 has a function of inputting a nominal diameter of the screw 9. The list box 52 has a function of inputting a type of the screw 9, that is, information concerning which of a coarse thread or a fine thread the screw 9 is. The list box 53 has a function of inputting a material of the screw 9. The list box 54 has a function of inputting a strength classification of the screw 9. The list box 55 has a function of inputting a material of an object to be fastened. In this embodiment, the object to be fastened is the work 81. The list box 56 has a function of inputting a material of the female screw 820 (the work 82). The nominal diameter of the screw 9, the type of the screw 9 (the information concerning which of the coarse thread or the fine thread the screw 9 is), the material of the thread 9, the strength classification of the thread 9, the material of the work 81, which is the object to be fastened, and the material of the female screw 820 are examples of characteristics of an object including the screw 9 used in the screw-tightening process. Surface treatment is included in the material. For example, when a black iron oxide film is provided in a base material made of steel, the black iron oxide film is also the material.

Note that, in addition to the list boxes 51 to 56 or instead of at least a part of the list boxes 51 to 56, other list boxes, for example, a list box (not shown in the figure) having a function of inputting a pitch of the screw 9 and a list box (not shown in the figure) having a function of inputting a fastening coefficient (Q) may be provided. The fastening coefficient is determined by requirements such as a fastening method (e.g., an electric screwdriver, a torque wrench, an impact wrench, or a wrench), surface states of the screw 9 and the female screw 820 (e.g., presence or absence of surface treatment, a method of the surface treatment, and a material), and a lubrication state (e.g., presence or absence of a lubricant and a type of the lubricant).

The text box 57 has a function of displaying recommended screw-tightening torque. The recommended screw-tightening torque refers to screw-tightening torque to be recommended. The screw-tightening torque is called tightening torque as well and refers to a force (torque) for turning the screw 9 in a rotating direction when turning and tightening (fastening) the screw 9. The recommended screw-tightening torque is explained below in detail.

The text box 58 has a function of inputting set screw-tightening torque. The set screw-tightening torque refers to screw-tightening torque to be set.

As shown in FIG. 6, when screw-tightening speed is set, a window for screw-tightening speed setting (a screen for screw-tightening speed setting) 6 is displayed on the display device 41.

In the window 6, a text box for display 61, a text box for input 62, and a button 63 (an icon) on which "next" is displayed are displayed.

The text box 61 has a function of displaying recommended screw-tightening speed. The recommended screw-tightening speed refers to screw-tightening speed to be recommended. The screw-tightening speed refers to speed (moving speed) for moving the screw 9 in the axial direction of the screw 9 when turning and tightening (fastening) the screw 9. The screw-tightening speed is calculated by a product of a lead of the screw 9 and the number of rotations of the screw 9. The lead of the screw 9 is a distance in which the screw 9 moves in the axial direction of the screw 9 when rotating once. Note that, in the case of a single-thread screw, a lead and a pitch are equal. In the case of an n-thread screw (n is an integer equal to or larger than 2), the lead is n times as large as the pitch.

The text box 62 has a function of inputting set screw-tightening speed. The set screw-tightening speed refers to screw-tightening speed to be set.

A method (a calculation method) of calculating recommended screw-tightening torque is explained. However, the method is an example and other methods may be used.

Recommended screw-tightening torque T is calculated using the following Expression (1).

$$T = 0.35 \cdot K \cdot (1 + 1/Q) \cdot \sigma y \cdot As \cdot d \quad (1)$$

In Expression (1) described above, K, Q, σy, As, and d are respectively as described below. Expression (1) described above is an expression based on an expression specified by JIS.

K: a torque coefficient
Q: a tightening coefficient (in this embodiment, set to, for example, "2")
σy: a yield point of the screw 9
As: an effective sectional area of the screw 9
d: a nominal diameter of the screw 9

The torque coefficient K is calculated using the following Expression (2).

$$K = 1/d \cdot [P/(2 \cdot \pi) + 0.577 \cdot \mu th \cdot d2 + 0.5 \mu \mu b \cdot Db] \quad (2)$$

In Expression (2) described above, d, P, μth, d2, μb, and Db are respectively as described below. Expression (2) described above is an expression based on an expression specified by JIS.

d: a nominal diameter of the screw 9
P: a pitch of the screw 9
μth: a coefficient of friction of a screw surface of the screw 9 against the female screw 820
d2: a reference dimension of an effective diameter of the screw 9
μb: a coefficient of friction of a bearing surface of the screw 9 against the work 81 (the object to be fastened)
Db: a diameter of the bearing surface of the screw 9 with respect to friction Expression (1) and Expression (2) described above are stored in the storing section 14 in advance and read out when necessary.

A procedure and a control operation of the control device 1 in setting screw-tightening torque and screw-tightening speed used in the screw-tightening process are explained with reference to FIGS. 5, 6, 12, and 13.

First, screw-tightening torque is set. In the setting of the screw-tightening torque, the user performs an operation instruction for inputting corresponding information respectively to the list boxes 51, 52, 53, 54, 55, and 56 in the window 5 (see FIG. 5) displayed on the display device 41. In the invention, "input" includes "selection".

Specifically, the user inputs a nominal diameter (e.g., "M1") of the screw 9 to the list box 51. The user inputs a type of the screw 9, that is, information concerning which of a coarse thread or a fine thread the screw 9 is (e.g., "a coarse thread") to the list box 52. The user inputs a material (e.g., "steel") of the screw 9 to the list box 53. The user inputs a strength classification (e.g., "3.6") of the screw 9 to the list box 54. The user inputs a material (e.g., "stainless steel") of the work 81, which is the object to be fastened, to the list box 55. The user inputs a material (e.g., "stainless steel") of the female screw 820 to the list box 56. In this case, drop-down lists are respectively displayed in the list boxes 51 to 56. The user performs an operation instruction for selecting corresponding items from the drop-down lists.

Note that a "composition classification of a material" and a "steel type classification" shown in FIG. 8 are input in an item of the "material". "Yield strength" shown in FIG. 8 is substantially synonymous with the "yield point". The yield strength is used for a material, a yield point of which is unclear. For example, when the material of the screw 9 is stainless steel, the yield point of the screw 9 in Expression (1) can be replaced with the yield strength of the screw 9.

Subsequently, the user performs an operation instruction to the button 59 on which "next" is displayed.

When the receiving section 15 receives the operation instruction to the button 59 by the user (step S101), the display control section 13 calculates recommended screw-tightening torque using Expression (1) and Expression (2) described above.

The display control section 13 instructs the display device 41 to display the recommended screw-tightening torque (step S102). According to the instruction, the display device 41 displays the recommended screw-tightening torque in the text box 57. Consequently, the user can grasp the recommended screw-tightening torque.

It is explained below how the information input to the list boxes 51 to 56 is reflected and the recommended screw-tightening torque can be calculated from Expression (1) and Expression (2) described above.

Note that, as explained above, the tables and the like shown in FIGS. 7 to 11 are stored in the storing section 14. A table (not shown in the figures) indicating a relation between the materials of the screw 9 and the female screw 820 and a coefficient of friction ($\mu$th) of the screw surface of the screw 9 against the female screw 820 is stored in the storing section 14. A table (not shown in the figures) indicating a relation between the materials of the screw 9 and the work 81 and a coefficient of friction ($\mu$b) of the bearing surface of the screw 9 against the work 81 (the object to be fastened) is stored in the storing section 14. A table (not shown in the figures) indicating a relation between the nominal diameter of the screw 9 and the diameter (Db) of the bearing surface of the screw 9 with respect to friction is stored in the storing section 14.

The nominal diameter of the screw 9 input to the list box 51 is described in the tables shown in FIGS. 9 to 11.

The nominal diameter of the screw 9 is M1, M2, M3, and the like. For example, in the nominal diameter "M1" of the screw 9, the nominal diameter is "1", which is a number after "M". A unit of the nominal diameter is "mm". Specifically, the nominal diameter is 1 [mm].

The information concerning which of a coarse thread or a fine thread the screw 9 is, which is input to the list box 52, is described in FIGS. 9 to 11.

The strength classification of the screw 9, which is input to the list box 54, is described in the tables shown in FIGS. 7 and 8.

In this embodiment, the tightening coefficient (Q) in Expression (1) is set to, for example, "2" as a fixed value.

The yield point ($\sigma$y) of the screw 9 in Expression (1) can be calculated on the basis of the strength classification of the screw 9 and the table shown in FIG. 7 or 8.

The effective sectional area (As) of the screw 9 in Expression (1) can be calculated on the basis of the nominal diameter of the screw 9, the information concerning which of a coarse thread or a fine thread the screw 9 is, and the table shown in FIG. 9.

The nominal diameter (d) of the screw 9 in Expression (1) is a number [mm] after "M". When a unit of the nominal diameter of the screw is "mm", a unit of torque is "N·mm".

Note that the recommended screw-tightening torque T may be calculated with the unit of the nominal diameter of the screw converted into "cm" and the unit of the torque converted into "N·cm".

In Expression (1), d, P, $\mu$th, d2, $\mu$b, and Db for calculating the torque coefficient (K) are as described below.

The nominal diameter (d) of the screw 9 in Expression (2) is a number [mm] after "M".

The pitch (P) of the screw 9 in Expression (2) can be calculated on the basis of the nominal diameter of the screw, the information concerning which of a coarse thread or a fine thread the screw 9 is, and the table shown in FIG. 10.

The coefficient of friction ($\mu$th) of the screw surface of the screw 9 against the female screw 820 in Expression (2) can be calculated on the basis of the material of the screw 9, the material of the female screw 820, and the table (not shown in the figures) indicating the relation between the materials of the screw 9 and the female screw 820 and the coefficient of friction ($\mu$th) stored in the storing section 14.

The reference dimension (d2) of the effective diameter of the screw 9 in Expression (2) can be calculated on the basis of the nominal diameter of the screw, the information concerning which of a coarse thread or a fine thread the screw 9 is, and the table shown in FIG. 11.

The coefficient of friction ($\mu$b) of the bearing surface of the screw 9 against the work 81 (the object to be fastened) in Expression (2) can be calculated on the basis of the material of the screw 9, the material of the work 81, and the table (not shown in the figures) indicating the relation between the materials of the screw 9 and the work 81 and the coefficient of friction ($\mu$b) stored in the storing section 14.

The diameter (Db) of the bearing surface of the screw 9 with respect to friction in Expression (2) can be calculated on the basis of the table (not shown in the figures) indicating the relation between the nominal diameter of the screw 9 and the diameter (Db) of the bearing surface of the screw 9 with respect to friction.

The recommended screw-tightening torque can be calculated as explained above.

Subsequently, the user performs an operation instruction for inputting the recommended screw-tightening torque to the text box 58 as set screw-tightening torque. In the operation instruction, after inputting a numerical value to the text box 58, the user performs an operation instruction to the button 59. Note that the recommended screw-tightening torque may be displayed in the text box 58 as an initial value.

The receiving section 15 receives an operation instruction by the user (step S103). When the receiving section 15 receives the operation instruction, an input value is transmitted to the screwdriver control section 12 via the display control section 13. The screwdriver control section 12 sets the input value as screw-tightening torque. When the screw-tightening torque is set, the number of rotations of the electric screwdriver 43 is set on the basis of a set value of the screw-tightening torque.

Note that, the user may input, as the set screw-tightening torque, a value other than the recommended screw-tightening torque. As a specific example, when screw tightening is not properly performed even if the recommended screw-tightening torque is input, the user is capable of inputting a value other than the recommended screw-tightening torque to solve the problem. When screw-tightening torque is determined at a point in time of design, the user is capable of inputting a determined value of the screw-tightening torque.

Subsequently, the user performs an operation instruction to the button 59 on which "next" is displayed.

When the receiving section 15 receives the operation instruction to the button 59 by the user, the display control section 13 instructs the display device 41 to display the window 6 instead of the window 5. According to the instruction, the display device 41 displays the window 6 (see FIG. 6).

The display control section 13 calculates the number of rotations of the electric screwdriver 43 on the basis of the set screw-tightening torque and calculates recommended screw-tightening speed on the basis of the number of rotations of the electric screwdriver 43 and the lead of the screw 9. Note that the lead of the screw 9 is calculated on the basis of the information concerning which of a coarse thread and a fine thread the screw 9 is and the pitch of the screw 9 based on the information concerning the nominal diameter of the screw 9.

The display control section 13 instructs the display device 41 to display the recommended screw-tightening speed (step S201). According to the instruction, the display device 41 displays the recommended screw-tightening speed in the text box 61. Consequently, the user can grasp the recommended screw-tightening speed.

Subsequently, the user performs an operation instruction for inputting the recommended screw-tightening speed to the text box 62 as set screw-tightening speed. In the operation instruction, after inputting a numerical value to the text box 62, the user performs an operation instruction to the button 63. Note that the recommended screw-tightening speed may be displayed in the text box 62 as an initial value.

The receiving section 15 receives an operation instruction by the user (step S202). When the receiving section 15 receives the operation instruction, an input value is transmitted to the robot control section 11 via the display control section 13. The robot control section 11 sets the input value as screw-tightening speed.

Note that the user may input a value other than the recommended screw-tightening speed as the set screw-tightening speed. As a specific example, when screw tightening is not properly performed even if the recommended screw-tightening speed is input, the user is capable of inputting the value other than the recommended screw-tightening speed to solve the problem.

When the input of all the parameters (items) is completed as explained above, a computer program used in executing the work including the screw-tightening process is generated.

As explained above, with the robot system 100, it is possible to easily, quickly, and accurately perform setting of screw-tightening torque in the screw-tightening process.

As explained above, the characteristics of the object including the screw 9 include the strength classification. Consequently, it is possible to more accurately perform the setting of the screw-tightening torque in the screw-tightening process.

The robot 2 fixes the work 81, which is an example of the first object, to the work 82, which is an example of the second object, by tightening the screw 9. The characteristics of the object including the screw 9 include the material of the screw 9, the material of the work 81 (the first object), and the material of the work 82 (the second object). Consequently, it is possible to more accurately perform the setting of the screw-tightening torque in the screw-tightening process.

The characteristics of the object including the screw 9 include the nominal diameter of the screw 9. Consequently, it is possible to more accurately perform the setting of the screw-tightening torque in the screw-tightening process.

The characteristics of the object including the screw 9 include information concerning which type of a coarse thread and a fine thread the screw 9 is. Consequently, it is possible to more accurately perform the setting of the screw-tightening torque in the screw-tightening process.

In the screw-tightening process, the screw 9 is rotated and tightened by the electric screwdriver 43, which is an example of the screwdriver. The receiving section 15 receives an input of the number of rotations of the electric screwdriver 43 (the screwdriver). The display control section 13 calculates, on the basis of the characteristics and the number of rotations of the electric screwdriver 43 (the screwdriver) received by the receiving section 15, recommended screw-tightening speed, which is an example of a value concerning screw-tightening speed at the time when the robot 2 tightens the screw 9, and causes the display device 41, which is an example of the display section, to display the recommended screw-tightening speed (the value concerning the screw-tightening speed). Consequently, it is possible to easily, quickly, and accurately perform setting of screw-tightening speed in the screw-tightening process.

The receiving section 15 receives an input of screw-tightening speed. In the screw-tightening process, the robot control section 11, which is an example of the control section, controls driving of the robot 2 on the basis of the screw-tightening speed received by the receiving section 15. Consequently, it is possible to accurately tighten the screw 9.

The robot 2 includes the electric screwdriver 43, which is an example of the screwdriver. That is, in this embodiment, the electric screwdriver 43 is used as the screwdriver. The receiving section 15 receives an input of screw-tightening torque. In the screw-tightening process, the screwdriver control section 12, which is an example of the control section, controls driving of the electric screwdriver 43 on the basis of the screw-tightening torque received by the receiving section 15. Consequently, it is possible to accurately tighten the screw 9.

The robot 2 includes the force detecting section 290 that detects a force. In the screw-tightening process, the robot control section 11, which is an example of the control section, performs force control on the basis of an output of the force detecting section 290 and controls driving of the robot 2. Consequently, for example, by appropriately setting a target force and performing the impedance control (the tracer control) as the force control, it is possible to suppress come-out, accurately tighten the screw 9, and suppress damage to the screw 9 and the work 81 and the work 82. By performing the impedance control, even if the screw 9 and the hole 810 (the female screw 820) deviate from each other, it is easy to insert the screw 9 into the hole 810 (the female screw 820).

The robot control section 11, which is an example of the control section, sets a target force in a direction orthogonal to the advancing direction of the screw 9 to 0 in the force control. Consequently, by setting the target force in the direction orthogonal to the advancing direction of the screw 9 to 0 and performing the impedance control (the tracer control) as the force control, it is possible to suppress come-out and accurately tighten the screw 9. By performing the impedance control, even if the screw 9 and the hole 810 (the female screw 820) deviate from each other, it is easy to insert the screw 9 into the hole 810 (the female screw 820).

The robot control section 11, which is an example of the control section, performs position control in at least a part of a period in which the force control is performed. Consequently, compared with when the screw tightening is performed by only the force control, it is possible to perform the screw tightening in a short time while causing the screw 9 to trace the hole 810 and the female screw 820.

Second Embodiment

Figure 14:
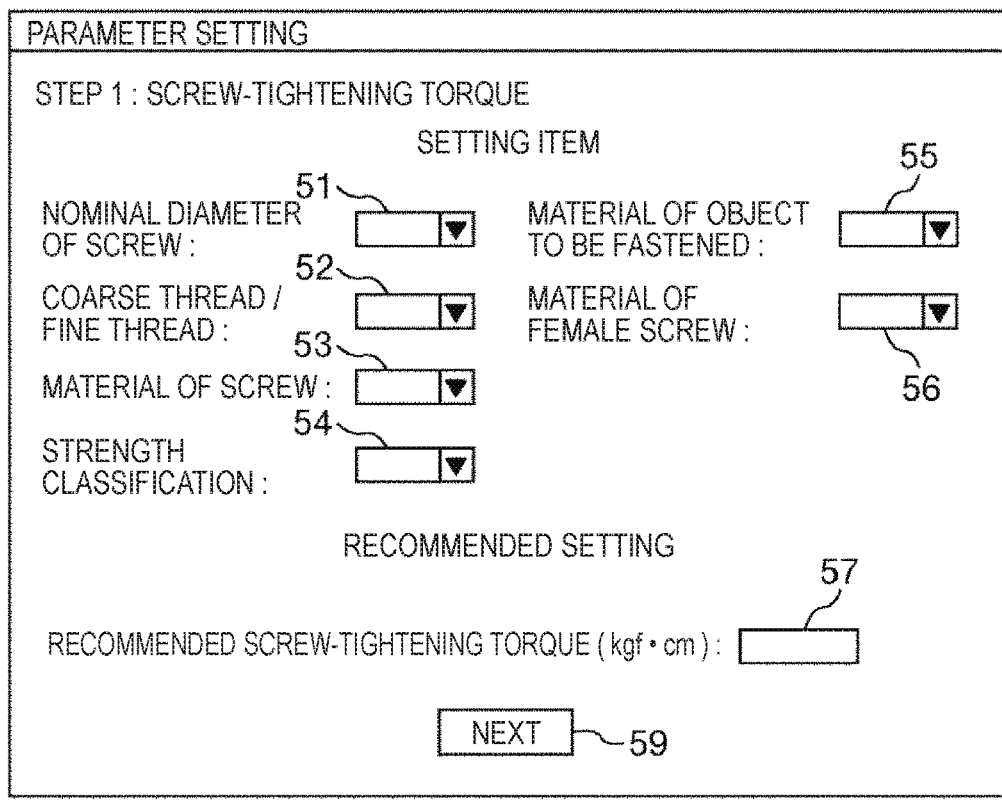
FIG. 14 is a diagram showing a window displayed on a display device of a robot system according to a second embodiment of the invention.
Figure 15:
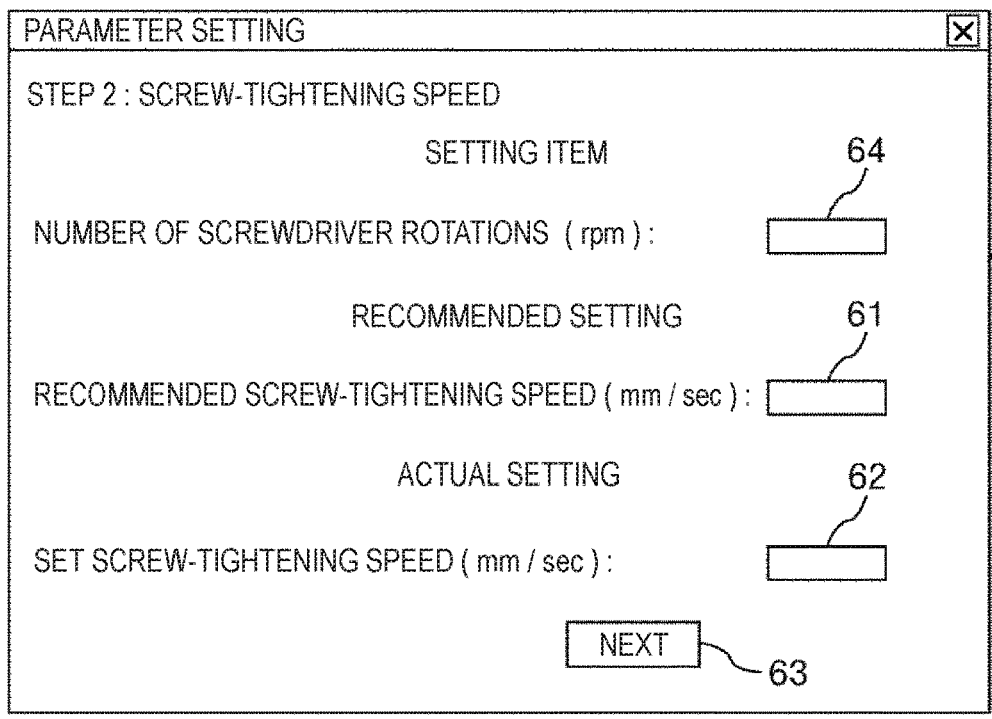
FIG. 15 is a diagram showing a window displayed on the display device of the robot system according to the second embodiment.
Figure 16:
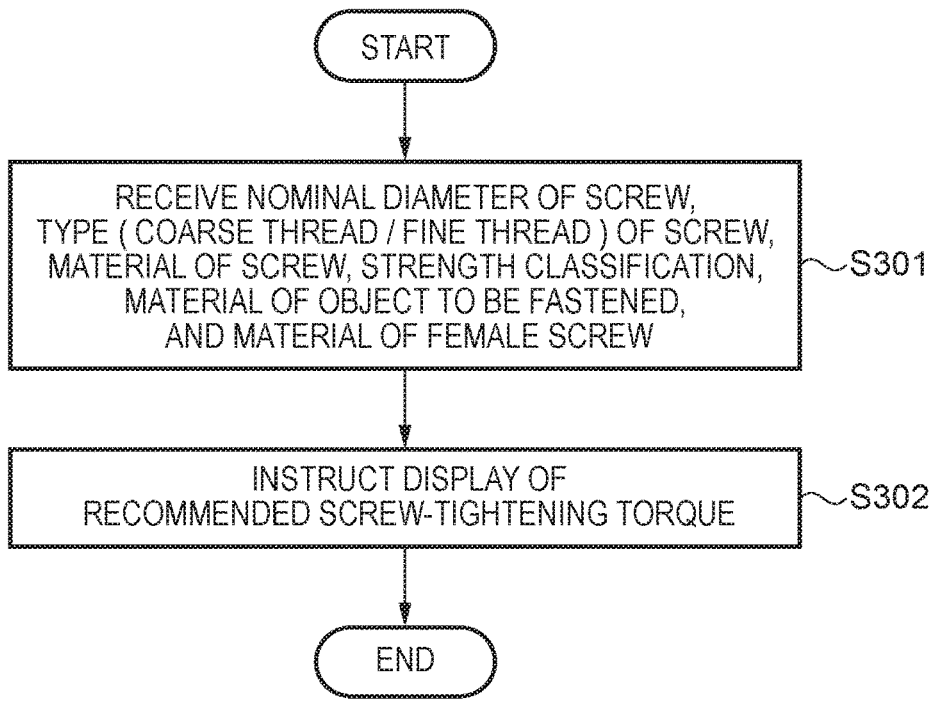
FIG. 16 is a flowchart for explaining a control operation of a control device of the robot system according to the second embodiment.
Figure 17:
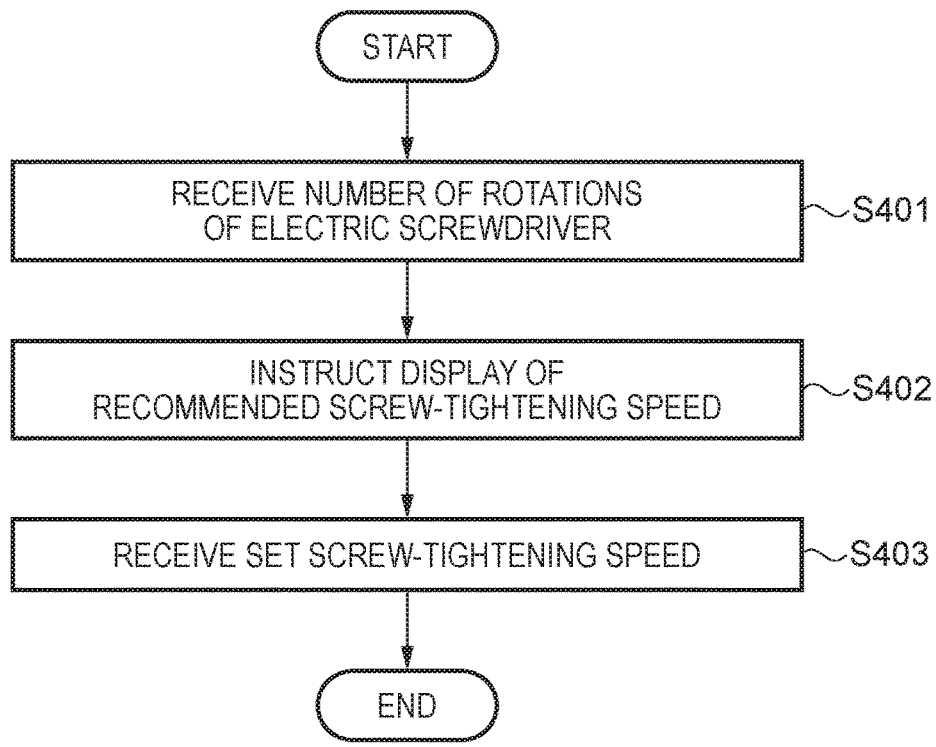
FIG. 17 is a flowchart for explaining a control operation of the control device of the robot system according to the second embodiment.

FIG. 14 is a diagram showing a window displayed on a display device of a robot system according to a second embodiment of the invention. FIG. 15 is a diagram showing a window displayed on the display device of the robot system according to the second embodiment. FIG. 16 is a flowchart for explaining a control operation of a control device of the robot system according to the second embodiment. FIG. 17 is a flowchart for explaining a control operation of the control device of the robot system according to the second embodiment.

The second embodiment is explained below. Differences from the first embodiment are mainly explained. Explanation concerning similarities to the first embodiment is omitted.

This embodiment is a mode in the case in which screw-tightening torque cannot be automatically set in the electric screwdriver 43. The input device 42 and the screwdriver control section 12 are electrically connected. Screw-tightening torque is directly input from the input device 42 to the screwdriver control section 12.

First, a window (a screen for screw-tightening torque setting) used in setting screw-tightening torque and screw-tightening speed is explained.

As shown in FIG. 14, in the robot system 100 in this embodiment, when screw-tightening torque is set, a window for screw-tightening torque setting (a screen for screw-tightening torque setting) 5A is displayed on the display device 41.

In the window 5A, the list boxes 51, 52, 53, 54, 55, and 56, the text box for display 57, and the button 59 (the icon) on which "next" is displayed are displayed. That is, compared with the first embodiment, display content of the window 5A is the same as the display content in the first embodiment except that the text box 58 is omitted.

As shown in FIG. 15, when screw-tightening speed is set, a window for screw-tightening speed setting (a screen for screw-tightening speed setting) 6A is displayed on the display device 41.

In the window 6A, the text box for display 61, the text box for input 62 and a text box for input 64, and the button 63 (the icon) on which "next" is displayed are displayed. That is, compared with the first embodiment, display content of the window 6A is the same as the display content in the first embodiment except that the text box 64 is added.

The text box 64 has a function of inputting the number of screwdriver rotations. The number of screwdriver rotations refers to the number of rotations of the electric screwdriver 43 in screw tightening.

A procedure and a control operation of the control device 1 in setting screw-tightening torque and screw-tightening speed used in a screw-tightening process are explained with reference to FIGS. 14, 15, 16, and 17.

First, screw-tightening torque is set. In the setting of the screw-tightening torque, a user performs an operation instruction for inputting corresponding information respectively to the list boxes 51, 52, 53, 54, 55, and 56 in the window 5A (see FIG. 14) displayed on the display device 41.

Subsequently, the user performs an operation instruction to the button 59 on which "next" is displayed.

When the receiving section 15 receives the operation instruction to the button 59 by the user (step S301), the display control section 13 calculates recommended screw-tightening torque using Expression (1) and Expression (2) described above.

The display control section 13 instructs the display device 41 to display the recommended screw-tightening torque (step S302). According to the instruction, the display device 41 displays the recommended screw-tightening torque in the text box 57. Consequently, the user can grasp the recommended screw-tightening torque.

Subsequently, the user gives, to the screwdriver control section 12, using the input device 42, an operation instruction for inputting the recommended screw-tightening torque as set screw-tightening torque. The screwdriver control section 12 sets an input value as screw-tightening torque. When the screw-tightening torque is set, the number of rotations of the electric screwdriver 43 is calculated on the basis of a set value of the screw-tightening torque and displayed on the display device 41 (not shown in the figure).

Note that the user may input a value other than the recommended screw-tightening torque as the set screw-tightening torque. As a specific example, when screw tightening is not properly performed even if the recommended screw-tightening torque is input, the user is capable of inputting the value other than the recommended screw-tightening torque to solve the problem. When screw-tightening torque is determined at a point in time of design, the user is capable of inputting a determined value of the screw-tightening torque.

Subsequently, the user performs an operation instruction to the button 59 on which "next" is displayed.

When the receiving section 15 receives the operation instruction to the button 59 by the user, the display control section 13 instructs the display device 41 to display the window 6A instead of the window 5A. According to the instruction, the display device 41 displays the window 6A (see FIG. 15).

Subsequently, the user performs an operation instruction for inputting the number of screwdriver rotations, that is, the number of rotations of the electric screwdriver 43 to the text box 64. In the operation instruction, the user inputs a numerical value to the text box 64. In this case, the user inputs, for example, the number of rotations (not shown in the figure) of the electric screwdriver 43 displayed on the display device 41, that is, the number of rotations of the electric screwdriver 43 calculated on the basis of the set value of the screw-tightening torque.

The receiving section 15 receives an operation instruction by the user (step S401). When the receiving section 15 receives the operation instruction, the display control section 13 calculates recommended screw-tightening speed on the basis of the input number of rotations of the electric screwdriver 43 and the lead of the screw 9. Note that the lead of the screw 9 is calculated on the basis of information concerning which of a coarse thread and a fine thread the screw 9 is and a pitch of the screw 9 based on information concerning a nominal diameter of the screw 9. The display control section 13 instructs the display device 41 to display the recommended screw-tightening speed (step S402). According to the instruction, the display device 41 displays the recommended screw-tightening speed in the text box 61. Consequently, the user can grasp the recommended screw-tightening speed.

Subsequently, the user performs an operation instruction for inputting the recommended screw-tightening speed as set screw-tightening speed to the text box 62. In the operation instruction, after inputting a numerical value to the text box 62, the user performs an operation instruction to the button 63. Note that the recommended screw-tightening speed may be displayed in the text box 62 as an initial value.

The receiving section 15 receives an operation instruction by the user (step S403). When the receiving section 15 receives the operation instruction, an input value is transmitted to the robot control section 11 via the display control section 13. The robot control section 11 sets the input value as screw-tightening speed.

Note that the user may input a value other than the recommended screw-tightening speed as the set screw-tightening speed. As a specific example, when screw tightening is not properly performed even if the recommended screw-tightening speed is input, the user is capable of inputting the value other than the recommended screw-tightening speed to solve the problem.

When the input of all the parameters (items) is completed as explained above, a computer program used in executing the work including the screw-tightening process is generated.

According to the second embodiment explained above, it is possible to exhibit the same effects as the effects in the first embodiment.

The control devices and the robot systems according to the embodiments of the invention are explained above. However, the invention is not limited to this. The components of the sections can be replaced with any components having the same functions. Any other components may be added to the invention.

The invention may be a combination of any two or more components (features) in the embodiments.

In the embodiments, the fixing part of the base of the robot is the ceiling section of the cell. However, the invention is not limited to this. Besides, examples of the fixing part include the wall section of the cell, the workbench, and the floor section.

In the embodiments, the robot is set in the cell. However, the invention is not limited to this. For example, the cell may be removed. In this case, examples of the fixing part of the base of the robot include the ceiling, the wall, the workbench, the floor, and the ground in the setting space.

In the embodiments, the number of turning axes of the robot arm is six. However, the invention is not limited to this. The number of turning axes of the robot arm may be, for example, two, three, four, five, or seven or more. That is, in the embodiments, the number of arms (links) is six. However, the invention is not limited to this. The number of arms may be, for example, two, three, four, five, or seven or more. In this case, for example, by adding an arm between the second arm and the third arm in the robot in the embodiments, it is possible to realize a robot including seven arms.

In the embodiments, the number of robot arms is one. However, the invention is not limited to this. The number of robot arms may be, for example, two or more. That is, the robot may be, for example, a plural-arm robot such as a double-arm robot.

In the invention, the robot (a robot main body) may be a robot of another type (form). Specific examples of the robot include a horizontal articulated robot and a leg-type walking (running) robot including legs. The "horizontal articulated robot" refers to a robot, an arm (excluding a spline shaft) of which moves in the horizontal direction.

The end effector that performs work on the object is not limited to the electric screwdriver and may be an end effector of another configuration. Specific examples of the end effector include a screwdriver. In this case, the robot arm grips the screwdriver with a hand and rotates the screwdriver.

The entire disclosure of Japanese Patent Application No. 2017-013482, filed Jan. 27, 2017 is expressly incorporated by reference herein.

What is claimed is:

1. A control device for controlling a robot that fixes a first object to a second object by tightening a screw, the control device comprising:
   a memory configured to store computer-executable instructions;
   a display configured to display screw-tightening information thereon; and
   a processor that is configured to execute the computer-executable instructions so as to:
   receive a characteristic, the characteristic being at least one of a screw strength classification, a material of the screw, a material of the first object, a material of the second object, a nominal diameter of the screw, or information concerning which type of a coarse thread or a fine thread the screw is;
   calculate a value of a recommended screw-tightening torque at a time of the tightening of the screw by the robot based on the characteristic; and
   display the value of the recommended screw-tightening torque on the display as the screw-tightening information.

2. A control method of a robot that fixes a first object to a second object by tightening a screw, the control method for causing a processor to execute a process, the method comprising executing on the processor the steps of:
   receiving a characteristic, the characteristic being at least one of a screw strength classification, a material of the screw, a material of the first object, a material of the second object, a nominal diameter of the screw, or information concerning which type of a coarse thread or a fine thread the screw is;
   calculating a first value of a recommended screw-tightening torque at a time of the tightening of the screw by the robot based on the characteristic; and displaying the first value of the recommended screw-tightening torque.

3. The control method according to claim 2, further comprising:

receiving a set screw-tightening torque, after the first value of the recommended screw-tightening torque is displayed.

4. The control method according to claim 3, further comprising:

calculating a second value of a recommended screw-tightening speed at a time of the tightening of the screw by the robot based on the set screw-tightening torque; and displaying the second value of the recommended screw-tightening speed.

5. The control method according to claim 4, further comprising:

receiving a set screw-tightening speed after the second value of the recommended screw-tightening speed.

* * * * *